Figure 5:
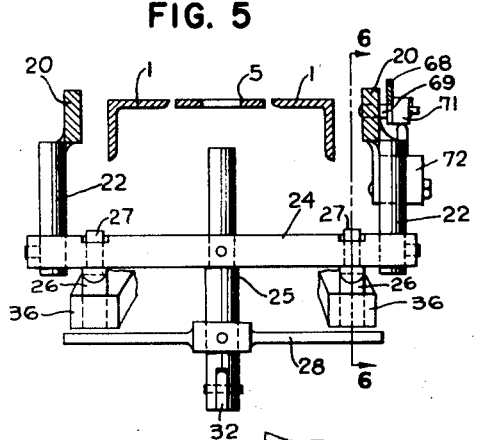

Sept. 12, 1950    G. W. CHEESEMAN ET AL    2,521,877
APPARATUS FOR DETECTING LIGHTWEIGHT
OR OVERWEIGHT PACKAGES AND ARTICLES
Filed March 24, 1949      3 Sheets-Sheet 1
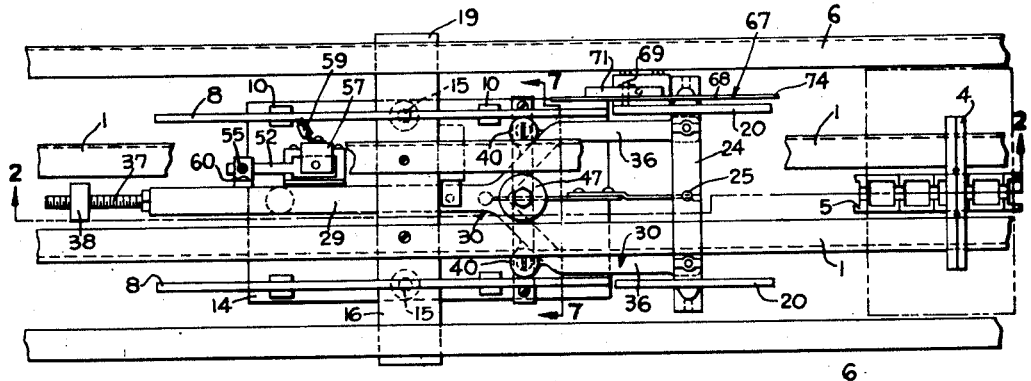
FIG. 1
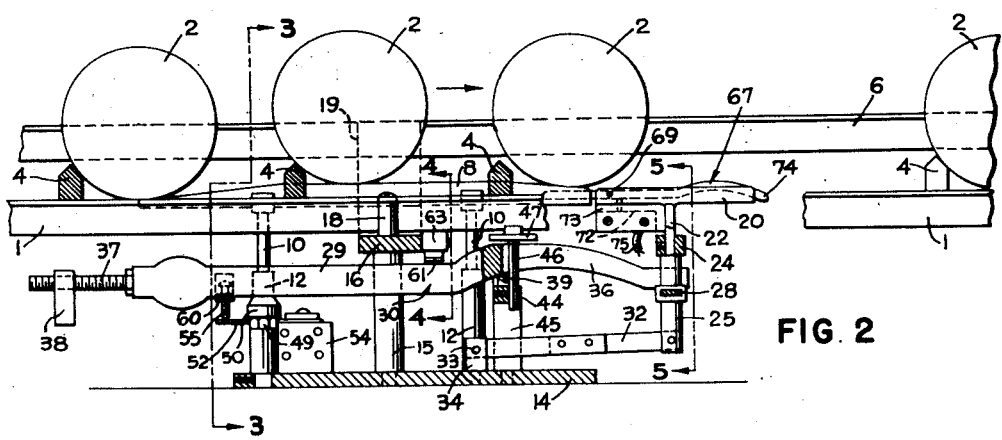
FIG. 2
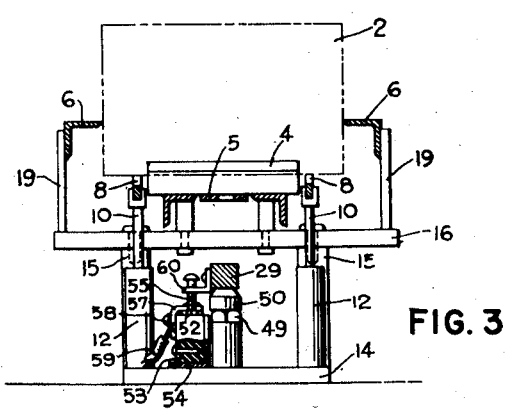
FIG. 3
FIG. 4
INVENTORS
George W. Cheeseman
BY George J. Chomis
Ely + Frye
ATTORNEYS Sept. 12, 1950  G. W. CHEESEMAN ET AL  2,521,877
APPARATUS FOR DETECTING LIGHTWEIGHT
OR OVERWEIGHT PACKAGES AND ARTICLES
Filed March 24, 1949  3 Sheets-Sheet 2

INVENTORS
George W. Cheeseman
BY George J. Chomis
Ely & Frye
ATTORNEYS

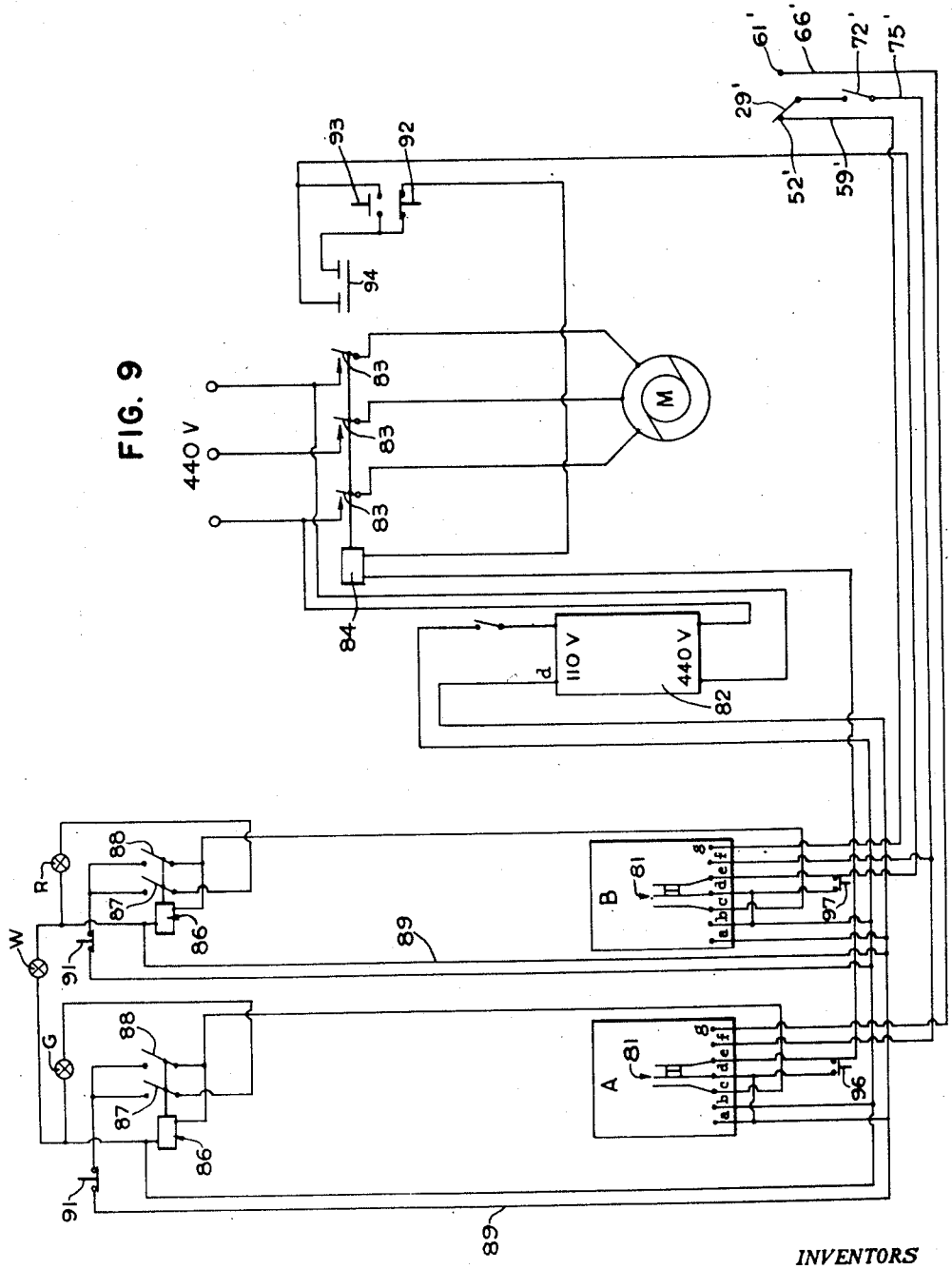

Patented Sept. 12, 1950

2,521,877

UNITED STATES PATENT OFFICE 2,521,877

APPARATUS FOR DETECTING LIGHT-WEIGHT OR OVERWEIGHT PACKAGES AND ARTICLES

George W. Cheeseman and George J. Chomis, Akron, Ohio, assignors to The Quaker Oats Company, Chicago, Ill., a corporation of New Jersey Application March 24, 1949, Serial No. 83,128

18 Claims. (Cl. 198—37)

1

The present invention relates to devices, to be incorporated in a conveying system, for detecting light-weight or over-weight packages and articles as they pass along the conveyor. While the principles of the invention may be applied to a variety of conveyor systems, the invention is illustrated as associated with conveyors in which cylindrical containers are rolled in a horizontal path through the conveyor system. Conveyors of this type often are interposed between a container filling machine and a device which applies a wrapper about the filled container.

In packaging such materials as cereals or the like it is essential that each of the packages contain a minimum but not more than a reasonable maximum weight of contents, and it is the purpose of the attachment shown and described herein to detect any off-weight packages while on the conveyor.

The device shown herein automatically arrests the movement of the conveyor when an off-weight package is found thereon and for this purpose there is located, in the conveyor, a movable track section which is counterweighted so that packages which contain the correct amount, within the specified limits, will depress the track section and be passed in an uninterrupted stream along the conveyor. When a light-weight container reaches the counterweighted track section the track section will not be depressed in sufficient amount, with the result that the conveyor will stop.

If an overweight container passes over the weighing section, the latter will be depressed beyond a medial position and, in this case, the conveyor will also stop. In either case the off-weight package can be manually removed for return to the original weighing station and the conveyor again started. However, it is not necessary to re-weigh the package to determine the direction of error since a system of tell-tale signalling is provided. With the information thus available, in the case of persisting off-weight packages it is merely necessary to instruct the weigher to adjust his machine in the proper direction.

This method of detecting under-weight containers requires that the conveyor be kept in motion at all times, except when an off-weight package has passed or is passing over the movable track section.

The problem has been, therefore, to devise an attachment for a conveyor of the type described which will permit the conveyor to operate continuously when no package is on the movable track section and when a package of correct weight is

2 passing over the track section, but will stop the conveyor when an off-weight package passes over the track section.

The mechanism shown and described herein responds to the special and peculiar requirements set forth, for it will act to stop the conveyor only when the counterweighted section is not balanced at a median value of deflection when a container is passing over it.

The mechanism to accomplish this result is simple and effective and has been found to operate so as to detect unerringly packages which differ by one-half ounce from the nominal weight. While the drawings and description illustrate the best known and preferred embodiment of the invention as it has been successfully employed in actual mill operations, it is possible that details thereof may be modified or improved upon within the scope of the invention as set forth in the appended claims.

Figure 6:
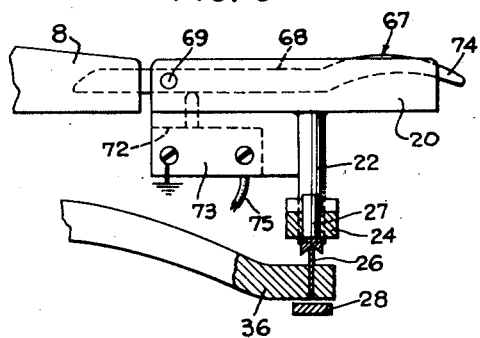
Figure 7:
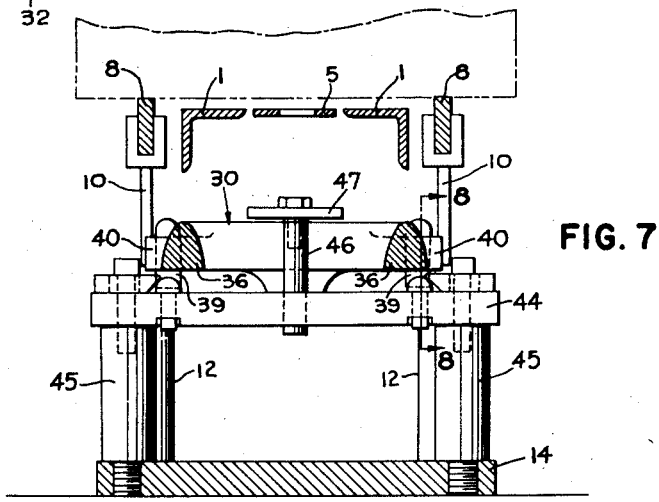
Figure 8:
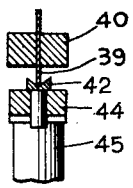

In the drawings:

Fig. 1 is a plan view of a section of a conveyor of the type in which cylindrical containers are rolled along a track, which has incorporated therein in the counterweighted track section or weighing platform for detecting off-weight containers;

Fig. 2 is a section on the line 2—2 of Fig. 1;
Fig. 3 is a section on the line 3—3 of Fig. 2;
Fig. 4 is a section on the line 4—4 of Fig. 2;
Fig. 5 is a section on the line 5—5 of Fig. 2;
Fig. 6 is a section on the line 6—6 of Fig. 5;
Fig. 7 is a section on the line 7—7 of Fig. 1;
Fig. 8 is a section on the line 8—8 of Fig. 7; and
Fig. 9 is a diagram of the wiring for the various switches which control the operation of the conveyor driving motor.

The conveyor in which the invention is incorporated comprises two parallel supporting rails 1 over which the cylindrical containers 2 roll as they are propelled in the direction of the arrows in Fig. 2 by a series of transverse slats or pushers 4 carried by an endless chain 5 which moves between the rails 1. The chain is shown in Figs. 1, 3, 5 and 7, but is omitted from the other views so as not to confuse the illustration. Above the rails 1 are located the two side rails 6 for the ends of the containers. The conveyor is of a standard construction and is illustrated merely for the purpose of showing the application of the invention. The conveyor chain is driven by a motor indicated at M in Fig. 9.

As the containers approach the weighing station, which in the form of the invention illustrated herein consists of a counterweighted track section which acts as a weighing platform, they are pushed up onto two elevated parallel stationary rails 8, the discharge ends of which are downwardly inclined so that as the containers are about to pass on to the counterweighted track section, each container will roll ahead of its slat 4 and will pass of its own momentum onto and through the weighing section. This insures that the container is completely freed of the propelling mechanism, which is necessary in order to obtain correct weighing of the package.

Each rail 8 is attached to two posts 10, the lower ends of which are seated in larger posts 12. The lower ends of the posts 12 are carried on a supporting plate 14. This plate 14 supports the scale beam and its associated parts and is suspended by two posts 15 from a transverse beam 16. The beam 16 is secured to the rails 8 by bolts passing through spacer sleeves 18 and at its ends is provided with vertical arms 19 fastened to the side rails 8.

The movable weighing platform or track section, to which reference has been made, comprises two short rails 20 located immediately at the discharge end of the stationary rails 8. The rails 20 are supported in the upper ends of posts 22, the lower ends of which are secured in the ends of a transverse beam 24 which extends across the conveyor beneath the rails 8. At its center the beam 24 is fitted over the reduced end of a vertical arm 25.

At its lower end the arm 25 is slotted to receive one end of a two-part link 32, the other end of which is pivoted at 33 in a slotted vertical post 34 fixed to the plate 14. It is desirable that the containers roll of their own momentum over the counterweighted track rails and it may happen that the incline from the stationary rails may not be sufficient. The adjustable link 32 provides a means for changing the tilt of the rail section 20 slightly to give the needed acceleration to the containers.

Referring to the scale beam 30: The forward end of this member is provided with two forked arms with parallel ends 36. Each end carries an upright knife-edge member 26 engageable in a saddle groove on the underside of a pin 27 carried by the beam 24 to provide the outer bearings of the scale beam. A crosspiece 28 carried by the arm 25 serves as a downward limit to motion of the ends 36 if the knife edges move away from the pins 27. The single, rearward arm 29 of the scale beam has an axial extension comprising a threaded pin 37 on which an adjustable counterweight 38 is mounted. Closely adjacent the fork, the scale beam is provided with two ears 40 which extend on either side thereof and carry the knife-edges 39 for the central or pivotal bearing of the scale beam. To support the scale beam two saddle-shaped pivotal supports 42 are located beneath the ears 40, on a bridge piece 44 mounted on posts 45 rising from the plate 14 (Fig. 8). Also located on the bridge piece is a pin 46 which rises in the crotch of the fork and is surmounted by a plate 47, this member keeping the scale beam in correct lateral position and providing an upper limit to motion of the scale beam. An adjustable stop 49 is also located beneath the rear end of scale beam 30 to limit its downward movement. This carries a rubber cushion cap 50 as a buffer.

In the operation of the device the scale beam is employed as a switch to stop the conveyor motor when holding an off-weight package. Generally speaking, this is accomplished by providing electrical contacts above and below the counter-weighted arm at appropriate distances from an intermediate position of the arm representing the nominal weight of package desired. If one of these is closed, as in the case of an off-weight package, a third switch on one of the rails 20 of the scale platform, which is closed by the passage of any package, will complete one of two circuits to stop the conveyor motor. Since the conveyor runs when both said circuits are open and the said third switch is open except when closed by a package, the conveyor will run when no package is on the platform. On the other hand, in the case of a package of normal weight, the counterweighted arm assumes a position intermediate the electrical contacts in its path and when the switch on the weighing platform is closed in the passage of a package the motor-stopping circuits both remain open.

The lower electrical contact on the scale beam comprises a metallic bar 52 fastened to the top of and extending from a block 53 of electrically insulating material which is secured to an angle bracket 54 fixed to the base 14. The bar 52 is fastened to the block 53 by a screw 56 which also secures an angle bracket 57. The latter, which is additionally fastened to the side of block 53 by a screw 58 conducts current to a lead 59 secured by the screw 58. The beam 29 makes electrical contact with the bar 52 through an adjustable screw 55 carried by an angle bracket 60, screw fastened to the beam 29.

The upper contact for the scale beam, best seen in Fig. 4, comprises a metallic bar 61 fastened by screws 62 to an electrically insulating block 63 carried by the beam 16 as by screws 64. The bar 61 conducts current to a lead 66 secured by one of the screws 62.

The platform switch is indicated generally at 67 and comprises a lever 68 mounted for swinging motion about a pin 69 carried by one of the arms 20 and passing through the lever 68 and a boss 71 thereon. The lever 68 is adapted, on downward movement, to actuate a microswitch 72 carried by a web 73 depending from the rail 20. The lever 68 has a terminal arcuate portion 74 for a purpose to be later detailed. A lead 75 of the weighing platform circuit connects with one side of the microswitch and the other side is in electrical connection with the weighing platform as indicated by the ground symbol in Fig. 6. The circuit is thus closed through the weighing beam from lead 75 to lead 59 or lead 66, as the case may be. Closing this circuit deenergizes the conveyor motor. Switch 72 is normally open, but any appreciable weight on lever 68 will suffice to close it.

In operation, the conveyor will run with no package on the weighing platform because, although the switch at 52 is closed, the switch 72 common to both circuits, either of which stop the motor when closed, is open. If a package, as it rolls onto rails 20, is above the minimum permissible weight, the contact at 52 will be broken prior to the closing of switch 72 by the action of the weight of the package on lever 68. If the package is of the correct weight, the weighing platform will be depressed to a point so as to break the contact at 52 but as the package is not sufficiently heavy to make the contact at 61, the closure of switch 72 which is in series with each of these, alternatively, will have no effect and the conveyor will continue to run. However, if the package is underweight the weighing platform will not be depressed and the contact at 52 will not be broken when switch 72 is closed and one of the circuits through the weighing beam will operate to deenergize the conveyor motor in a manner presently to be explained. If the package is overweight the weighing platform will be depressed to a sufficient extent to effect closure of switch 61 and the subsequent closure of switch 72 will close the other circuit through the weighing beam to bring about deenergization of the motor.

After a package rolls off the rails 20, the latter quickly return to their normal upper position and, the microswitch 72 being so sensitive, there is a likelihood that it will effect accidental closure after the contact at 52 has been restored, in which case the motor would stop without due cause. This occurrence is effectively avoided by the provision of the arcuate section 74. Since this normally extends beyond the rail 20, it will serve to reopen the switch 72 in a gradual manner independently of the rail 20 but in sufficient time to effect opening of the switch prior to reclosing of contact 52.

The electrical circuits which secure the foregoing results will now be described.

Referring to Fig. 9, which shows the condition of the circuits when no package is on the weighing platform: The switches corresponding to those in the weighing platform circuit are found at the lower, right hand corner and are indicated by the same reference numerals given above, qualified by prime marks. Two circuits are closeable alternatively by the switch 29', which represents the counterweighted arm of the weighing beam, and these circuits, respectively, are adapted to actuate electronic relays A and B which in turn deenergize the motor M and energize either the green light G, in the case of an overweight package, or the red light R, in the case of an underweight package, as the case may be, these lights persisting until the motor is reenergized manually. The white light is in the power circuit and is energized at all times when the power is on.

In the case of an underweight package, relay B is actuated to stop the motor and energize red light R when switch 72' is closed. In this case, as well as in the case where no package is on the weighing platform, switch 29' is closed at 52' which sets up a circuit through line 59' to relay B. This circuit is completed when the underweight package closes switch 72'. In the case of an overweight package, switch 29' is closed at 61' and sets up a circuit, through line 72', to relay A which is completed when the overweight package closes switch 72' to stop the motor and energize green light G. If the package is of normal weight, within the prescribed limits, switch 29' will assume a position intermediate contacts 52' and 61', leaving the circuits to relays A and B open, respectively, at contacts 52' and 61' and, therefore, when switch 72' is closed by the package of normal weight, neither relay is actuated, the motor continues to run and the signal lights are not energized. The departure of any package from the weighing platform results in the reclosing of switch 29' on contact 52' and the reopening of switch 72'.

Line 75', which contains the switch 72' representing the microswitch on the weighing platform, is common to the two relays A and B, and the relays A and B function in identical manner and only one need be described. The line to relay B is closed at contact 52' if the package is underweight or if no package is on the weighing platform. The circuit completed by closure of switch 72' includes posts f and g and shorts the relay in a known manner, removing the bias from the grid of an electronic tube and dropping the switch 81 to break the contact between d and e and establish contact between c and d. Posts d of the respective relays are across the output of a stepdown transformer 82 shunted in the supply voltage to the motor. The switches 83 of the motor are actuated by a solenoid 84 which is across the leads d in a circuit which passes through the post e of each relay. Thus, breaking of the switch connecting d and e in either relay will open switches 83 and stop the motor. When posts c and d are connected by switch 81 a solenoid 86 is energized by transformer 82 closing a relay with switches 87, 88. These switches in series place light R across the transformer output and are sealed in by the placing of solenoid 86 in the transformer output through switch 88 and a line 89 connected to the same side of the line as the d post. Thus the light R will remain lit even after the relay A has been restored to normal condition for running of the conveyor and can only be deenergized by opening of a switch 91.

A stop switch 92 is provided in the circuit of solenoid 84. The conveyor may be stopped at will by manually opening the switch 92. Assuming the circuits of the weighing platform open at contacts 72' and 61' and the relays A and B, therefore, in normal condition with posts d and e connected, the motor is started by closing a normally open switch 93 which closes a self-sealing switch 94. The automatic stopping features may be thrown out by closing switches 96 and 97, which shorts out both relays in the circuit of solenoid 84.

In describing the invention in its best known operating form it has been necessary to go into certain details of the device which are not essential to operative embodiments of the invention. It will be understood, therefore, that the invention may be altered as to non-essential details without sacrificing any of its benefits. The invention is primarily intended for detecting abnormal weight containers of cylindrical form which will roll onto the weighing section of a conveyor, but the principles thereof may be applied to other types of containers. The invention is also adapted to detect off-weight articles of any nature and is not necessarily restricted to the handling of containers or packages.

What is claimed is:

1. In a conveyor system for handling containers, a conveyor for propelling containers through the system, a motor for driving the conveyor, a movable counterweighted track section in the system, said track section being adapted to be depressed only by a container of full weight or more, a main power switch for the motor, means actuated by the movement of a container over the track section to open the switch, and a device for holding the power switch in closed position if the track section is depressed to a position between two limiting values.

2. In a conveyor system for handling containers, a conveyor for propelling containers through the system, a motor for driving the conveyor, a movable counterweighted track section in the system over which the containers are moved by the conveyor, said track section being depressible only by containers having at least the minimum required weight, a main power switch for the motor, a pair of circuits comprising means for opening the power switch when either of the said circuits is closed, a normally open switch in series with a normally closed switch in one of the circuits, said normally open switch being closed by any container on the track section and said normally closed switch being opened by any container above a predetermined minimum weight, and a second normally open switch in series with the first normally open switch and closable by a container on the platform having a weight greater than a predetermined maximum.

3. In a conveyor system for handling containers, a conveyor for propelling containers through the system, a motor for driving the conveyor, a movable counterweighted track section in the system over which the containers are moved by the conveyor, said track section being depressible only by containers having at least the minimum required weight, a main power switch for the motor, a pair of circuits comprising means for opening the power switch when either of said circuits is closed, a normally open switch in series with a normally closed switch and with a normally open switch in the respective said circuits, the normally closed switch being opened when the track section is depressed and the second-mentioned normally open switch being closed when the track section is depressed an amount greater than a predetermined maximum, the first-mentioned normally open switch being in the path of a container while it is moving over the track section, and movable to closed position by the container.

4. A conveyor system as in claim 2, said first-mentioned normally open switch comprising a container-contacting lever with an arcuate section whereby the switch is restored to open position in a gradual manner as the container leaves the said track section.

5. A conveyor system as in claim 3, said first-mentioned normally open switch comprising a container-contacting lever with an arcuate section whereby the said first-mentioned, normally open switch is restored to open position in a gradual manner as the container leaves the said track section.

6. A conveyor system for handling cylindrical containers, a stationary track section and a movable counterweighted track section in the system, a conveyor for rolling the containers over said track sections, a downwardly inclined discharge end for the stationary track section so that the containers roll ahead of the conveyor and across the movable track section, said movable track section being depressed only when a container of full weight or more is rolling thereover, and means associated with the movable track section for causing the conveyor to operate continuously when no container is on it and when it is depressed by a container having a weight of a magnitude between a predetermined minimum and a predetermined maximum.

7. A conveyor system for handling cylindrical containers, a stationary track section and a movable counterweighted track section in the system, a conveyor for rolling the containers over said track sections, a downwardly inclined discharged end for the stationary track section so that the containers roll ahead of the conveyor and across the movable track section, said movable track section being depressed only when a container of full weight or more is rolling thereover, and means associated with the movable track section for causing the conveyor to operate continuously when no container is on it and when it is depressed by a container having a weight between a predetermined maximum and minimum, and means to stop the conveyor when a container having a weight above the said maximum or below the said minimum is on the movable track section.

8. In a conveyor system for handling containers, a weighing section in the system, means for moving the containers over the weighing section, said means comprising a conveyor and a motor to drive the conveyor, and three switches at the weighing section adapted to control the motor, and positioned for actuation by the weight of the containers, one of said switches being open only when a container of predetermined minimum weight is on the weighing section, another of said switches being open only when a container below a predetermined maximum weight is on the weighing section, and the third switch being open at all times except when a container is on the weighing section.

9. In a conveyor system for handling containers, a weighing section in the system, means for moving the containers over the weighing section, said means comprising a conveyor and a motor to drive the conveyor, and three switches adapted to control the motor, one of said switches being open only when a container of predetermined minimum weight is on the weighing section, another of said switches being open only when a container below a predetermined maximum weight is on the weighing section, and the third switch being open at all times except when a container is on the weighing section, said third switch being located at the weighing section in the path of a container, and closed by the movement of a container over the weighing section.

10. In a conveyor system for handling containers, a weighing section in the system, a conveyor for moving the containers over the weighing section, a motor to drive the conveyor, a pair of circuits having a common line to control the motor, a switch in the common line in series with a switch in each of said circuits, the switch in one of said circuits being open only when a container above a predetermined minimum weight is on the weighing section, the switch in the other of said circuits being closed only when a container above a predetermined maximum weight is on the weighing section, the switch in the said common line being located on the weighing section, and actuating means for the said common line switch adapted to close said switch by contact with a container while it is on the weighing section.

11. In a conveyor system for handling containers, a weighing section in the system, a conveyor for moving the containers over the weighing section, a motor to drive the conveyor, a pair of circuits to control the motor, a switch in a common line of said circuits actuable by the weight of a container on the weighing section, a switch in each of said circuits, each in series with the first-mentioned switch and operable, alternatively, by under-weight or over-weight containers, and distinctive signal means controlled, respectively by said circuits.

12. In a conveyor system for handling containers, a weighing section in the system, a conveyor for moving the containers over the weighing section, a motor to drive the conveyor, a pair of circuits to control the motor, a switch in a common line of said circuits actuable by the weight of a container on the weighing section, a switch in each of said circuits, each in series with the first-mentioned switch and operable, alternatively, by under-weight or over-weight containers, and distinctive signal means controlled, respectively, by said circuits, said signal means, when actuated, persisting until manually deenergized.

13. In a conveyor system for handling containers, a weighing section in the system, a conveyor for moving the containers over the weighing section, a motor to drive the conveyor, switch means for the motor, a power circuit to operate the switch means, a pair of relays each having a switch in series in said power circuit, normally closed when the motor is running, a signal means associated with each relay, switch means in each, responsive to opening of the normally closed switch to energize the signal means of said relay, means responsive to passage of an under-weight container over the weighing section to open the normally closed switch of one of the relays, and means responsive to passage of an over-weight container over the weighing section to open the normally closed switch of the other of said relays.

14. In a conveyor system for handling containers, a weighing section in the system, a conveyor for moving the containers over the weighing section, a motor to drive the conveyor, switch means for the motor, a power circuit to operate the switch means, a pair of relays each having a normally closed switch in series in said power circuit, and a normally open switch having a common terminal with the normally closed switch, said common terminals being across the power circuit, a signal means associated with each relay and connectible with the power circuit through said normally open switch and the one of said common terminals in the other relay, means responsive to passage of an under-weight container over the weighing section to operate the switch of one relay, and means responsive to passage of an over-weight container over the weighing section to operate the switch of the other relay.

15. In a conveyor system for handling containers, a weighing section in the system, a conveyor for moving the containers over the weighing section, a motor to drive the conveyor, switch means for the motor, a power circuit to operate the switch means, a pair of relays each having a normally closed switch in series in said power circuit, and a normally open switch having a common terminal with the normally closed switch, said common terminals being across the power circuit, a signal means associated with each relay and connectible with the power circuit through said normally open switch and the one of said common terminals in the other relay, means responsive to passage of an under-weight container over the weighing section to operate the switch of one relay, and means responsive to passage of an over-weight container over the weighing section to operate the switch of the other relay, the last mentioned means comprising a pair of circuits each adapted to open the normally closed switch of one of the relays, a switch in one of said pair of circuits closed in an upper position of said weighing section, a switch in the other of said pair of circuits closed in a downward position of said weighing section, and a switch in series with each of the switches in said pair of circuits and closable in response to the presence of a container on the weighing section.

16. In a conveyor system for handling containers, a weighing section in the system, a conveyor for moving the containers over the weighing section, a motor to drive the conveyor, switch means for the motor, a power circuit to operate the switch means, a pair of relays each having a switch in series in said power circuit, normally closed when the motor is running, a signal means associated with each relay, switch means in each, responsive to opening of the normally closed switch to energize the signal means of said relay, means responsive to passage of an under-weight container over the weighing section to open the normally closed switch of one of the relays, and means responsive to passage of an over-weight container over the weighing section to open the normally closed switch of the other of said relays, the signal energizing means comprising a normally open switch in each relay having a common terminal with the normally closed switch and a contact leading to the said common contact of the other relay through a solenoid, said common terminals being across the said power circuit, and a double switch operated by said solenoid to place both said signal means and said solenoid in the power circuit through said common terminals.

17. In a conveyor system for handling containers, a weighing section in the system, a conveyor for moving the containers over the weighing section, a motor to drive the conveyor, switch means for the motor, a power supply for the switch means, a pair of relays each having a normally closed switch in series with the power supply to the motor switch, a signal means associated with each relay and in series with the power supply through a normally open switch of its associated relay, and switch means responsive to passage of an off-weight package over the weighing section to open the normally closed switch and close the normally open switch of one relay or the other depending upon whether the off-weight package is under-weight or over-weight.

18. In a system as in claim 17, means to seal in the energized signal means when a relay is actuated.

GEORGE W. CHEESEMAN.
GEORGE J. CHOMIS.

REFERENCES CITED

The following references are of record in the file of this patent:

UNITED STATES PATENTS

| Number | Name | Date |
|---|---|---|
| 1,355,488 | McKenney | Oct. 12, 1920 |
| 1,848,102 | Blair | Mar. 8, 1932 |
| 1,916,552 | Beach | July 4, 1933 |
| 2,104,546 | Pennell | Jan. 4, 1938 |
| 2,235,725 | Nordquist | Mar. 18, 1941 |